United States Patent
Cho

(10) Patent No.: US 10,859,042 B2
(45) Date of Patent: Dec. 8, 2020

(54) EGR VALVE UNIT

(71) Applicant: HYUNDAI KEFICO CORPORATION, Gyeonggi-do (KR)

(72) Inventor: Ung Rae Cho, Gyeonggi-do (KR)

(73) Assignee: HYUNDAI KEFICO CORPORATION, Gyeonggi-do (KR)

( * ) Notice: Subject to any disclaimer, the term of this patent is extended or adjusted under 35 U.S.C. 154(b) by 49 days.

(21) Appl. No.: 16/234,378

(22) Filed: Dec. 27, 2018

(65) Prior Publication Data

US 2019/0203672 A1 Jul. 4, 2019

(30) Foreign Application Priority Data

Dec. 29, 2017 (KR) .......................... 10-2017-0183778

(51) Int. Cl.
*F02M 26/64* (2016.01)
*F02M 35/10* (2006.01)

(52) U.S. Cl.
CPC ...... *F02M 26/64* (2016.02); *F02M 35/10222* (2013.01); *F02M 35/10373* (2013.01)

(58) Field of Classification Search
CPC ............. F02M 26/64; F02M 35/10222; F02M 35/10373; F02M 26/67; F02M 26/70; F02D 2041/0017
USPC ........................................ 123/568.19, 568.16
See application file for complete search history.

(56) References Cited

U.S. PATENT DOCUMENTS

| | | | | |
|---|---|---|---|---|
| 5,562,085 A | * | 10/1996 | Kosuda | F02D 17/02 123/198 F |
| 6,267,352 B1 | * | 7/2001 | Semeyn, Jr. | F02D 9/02 123/339.15 |
| 7,516,724 B2 | * | 4/2009 | Ohtsuji | F02B 25/22 123/73 A |
| 8,261,725 B2 | * | 9/2012 | Furukawa | F02M 26/64 123/568.19 |
| 2005/0241702 A1 | * | 11/2005 | Blomquist | F02M 26/21 137/625.31 |
| 2006/0081077 A1 | * | 4/2006 | Spakowski | F02M 26/54 74/89.18 |
| 2010/0089370 A1 | * | 4/2010 | Furukawa | F02M 26/67 123/568.12 |
| 2011/0023846 A1 | * | 2/2011 | Miyazaki | F02M 26/05 123/568.16 |
| 2012/0145134 A1 | * | 6/2012 | Miyazaki | F02M 26/70 123/568.2 |
| 2012/0272646 A1 | * | 11/2012 | Moritani | F02M 26/21 60/605.2 |
| 2012/0297766 A1 | * | 11/2012 | Inagaki | F02M 26/54 60/605.2 |

(Continued)

FOREIGN PATENT DOCUMENTS

JP 2011220296 A * 11/2011 ............. F02M 26/64
KR 10-1664069 B1 10/2016

*Primary Examiner* — Sizo B Vilakazi
*Assistant Examiner* — Brian R Kirby
(74) *Attorney, Agent, or Firm* — Mintz Levin Cohn Ferris Glovsky and Popeo, P.C.; Peter F. Corless

(57) ABSTRACT

An EGR valve unit is provided. The EGR valve unit comprises a segment gear disposed on a shaft of an EGR valve, a rotation arm disposed on a shaft of an air intake valve, a bearing disposed on the rotation arm via a pin, and a cam member disposed on the segment gear and formed with a push part configured to push the bearing to rotate the rotation arm when the EGR valve is operated.

6 Claims, 6 Drawing Sheets

(56) References Cited

U.S. PATENT DOCUMENTS

2013/0104859 A1* 5/2013 Miyazaki ............... F02M 26/64
                                                    123/568.21
2013/0174689 A1* 7/2013 Inagaki ................ F02M 26/70
                                                    74/569
2014/0007835 A1* 1/2014 Bykans .................. F16K 11/22
                                                    123/190.1

* cited by examiner

EGR VALVE UNIT

CROSS-REFERENCE TO RELATED APPLICATIONS

This application claims priority to Korean Patent Application No. 10-2017-0183778, filed on Dec. 29, 2017, the disclosure of which is incorporated herein by reference in its entirety.

TECHNICAL FIELD

The present disclosure relates to an EGR valve unit, and more particularly to an EGR valve unit that recirculates exhaust gas to an engine.

RELATED ART

Diesel engines are widely used in commercial vehicles such as passenger cars, buses and trucks and throughout the industries since the diesel engines have an improved fuel efficiency than gasoline engines. However, exhaust gas from diesel-engine vehicles contains harmful substances such as carbon monoxide (CO), hydrocarbons (HC) and oxides of nitrogen (NOx). The oxides of nitrogen (NOx) among these substances are generated by a combination of oxygen and nitrogen at high pressure and high temperature and cause corrosion of buildings and destruction of ecosystems since they become a cause of acid rain and a cause of various respiratory diseases such as bronchitis, pneumonia and asthma in human bodies.

Generally, the exhaust gas recirculation (EGR) refers to a technique in which a part of exhaust gas from an engine is circulated back to an air intake system of the engine to utilize the exhaust gas together with the outside air for combustion. Recirculating the exhaust gas has an effect on reducing NOx that is discharged into the atmosphere.

The EGR can be categorized as a high-pressure EGR (HP EGR) and a low-pressure EGR (LP EGR), depending on the position where the exhaust gas is recirculated. Specifically, the HP EGR uses high temperature and pressure exhaust gas having small pressure drop as the EGR gas by means of a recirculating flow path connected from a front end of a turbine of a turbocharger to an air intake manifold side. On the contrary, the LP EGR has a difference in that exhaust gas of which pressure is dropped more in comparison with the HP EGR is used as the EGR gas by means of the recirculation flow path connected from a rear end of the turbine to an outside air suction flow path side leading to a front end of a compressor.

The LP EGR, inter alia, is disposed downstream of a diesel oxidation catalyst (DOC), a diesel particulate filter (DPF) and/or a selective catalytic reduction (SCR) wherein it has an advantage in that contaminants in the recirculated gas are present in a smaller amount compared to the HP EGR. In addition, the LP EGR is relatively advantageous in comparison with the HP EGR in terms of cooling the temperature of intake air and in terms of cylinder-to-cylinder distribution of EGR. In recent years, attention has been paid to the fact that the LP EGR has an advantage on improvement of fuel efficiency, and therefore the LP EGR is receiving increasing attention in attempting to apply it to a vehicle equipped with a gasoline engine as well as a vehicle equipped with a diesel engine.

Therefore, an EGR valve that can reduce contaminants and increase efficiency in terms of fuel economy is needed.

SUMMARY

The present disclosure has been made in effort to solve the above-described problems associated with the prior art. It is an object of the present disclosure to provide an EGR valve unit capable of reducing contaminants and increasing fuel efficiency and of preventing sudden fluctuation in output of an engine and stoppage of the engine by configuring the EGR valve such that even when an abnormality occurs in a return spring of an air intake valve, the air intake valve can be returned back and controlled continuously.

Other objects and advantages of the present disclosure can be understood by the following description and become apparent with reference to the exemplary embodiments of the present disclosure. Also, it is obvious to those skilled in the art to which the present disclosure pertains that the objects and advantages of the present disclosure can be realized by the means as claimed and combinations thereof.

In accordance with an aspect of the present disclosure for accomplishing the object as mentioned above, an EGR valve unit may include a segment gear disposed on a shaft of an EGR valve, a rotation arm disposed on a shaft of an air intake valve, a bearing disposed on the rotation arm via a pin, and a cam member disposed on the segment gear and formed with a push part configured to push the bearing to rotate the rotation arm when the EGR valve is operated. The bearing may be configured to abut an outer peripheral surface of the cam member to allow the bearing to move along the outer peripheral surface of the cam member when the cam member rotates.

The EGR valve may further comprise a return guide disposed on the segment gear to allow the rotation arm to move in guidance by the return guide to return the air intake valve to a default position together with the EGR valve when the EGR valve returns to the default position. The return guide may include a first end thereof fixed to one side of the segment gear by means of bolts and a second end overlapping with the rotation arm, and a cam profile aperture may be formed in the overlapping portion. A free end of the pin may be inserted into the cam profile aperture to allow a wall surface of one side of the cam profile aperture may push the free end of the pin and thus rotate the rotation arm to a default position.

The cam profile aperture may include a shape that corresponds to a cam profile face of the cam member to prevent the pin from interfering with the inner surface of the cam profile aperture when the segment gear and the rotation arm operate normally. A gap may be formed between the free end of the pin and the wall surface of the one side end of the cam profile aperture when the segment gear and the rotation arm are in the default positions.

The EGR valve unit may further include an air intake valve return sensor for detecting a non-return state of the air intake valve, and an engine control unit may receive a signal from the air intake valve return sensor and recognize the non-return state of the air intake valve and activate a warning sign on an instrument panel.

Each of the EGR valve and the air intake valve may include a return spring for allowing the EGR valve and the air intake valve to return to the default positions, respectively. An intermediate gear may be meshed with the segment gear while an output gear of a motor may be meshed with the intermediate gear.

According to the present disclosure as described above, the EGR valve unit may reduce contaminants and increase efficiency in fuel economy. In particular, due to the return guide provided in the segment gear, the air intake valve may always return to the default position whenever the EGR valve returns to the default position.

Accordingly, the air intake valve may return to the default position by the return guide even when an abnormality occurs in the return spring of the air intake valve to allow the air intake valve to be controlled uninterrupted and thus to prevent the engine output from fluctuating or to prevent the engine from stalling during the operation.

Further, the air intake valve may be returned by the return guide to a position that is less than a normal default position by a predefined amount, the discrepancy may be detected by the sensor, and the detected signal may be transmitted to the engine control unit. The engine control unit may then recognize that the return spring of the air intake valve has failed and may activate the warning sign. Therefore, when the warning sign is activated, the driver may drive the vehicle to a repair shop and have the return spring of the air intake valve repaired or replaced.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
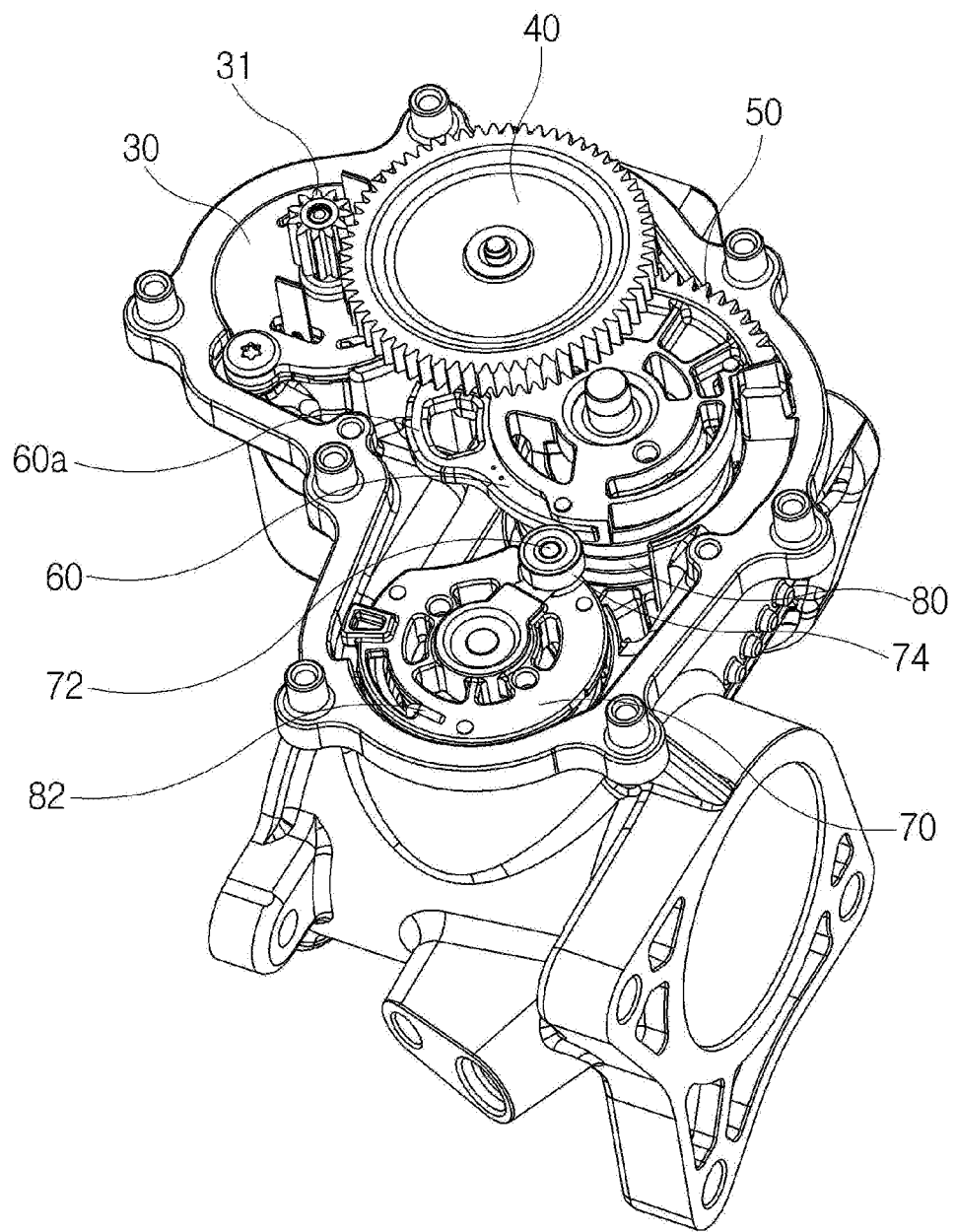
FIG. 1 is a perspective view of an EGR valve unit according to exemplary embodiments of the present disclosure.

Although various modifications to the present disclosure may be made and the present disclosure may have various embodiments, exemplary embodiments of the present disclosure will be illustrated by way of example in the drawings and described in detail below. However, it is to be understood that these are not intended to limit the present disclosure to the exemplary embodiments but the present disclosure covers all modifications, equivalents and alternatives falling within the spirit and scope of the disclosure. It is noted that thicknesses of lines, dimension of components shown in the drawings and the like may be expressed exaggeratedly for clarity and convenience of description.

In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
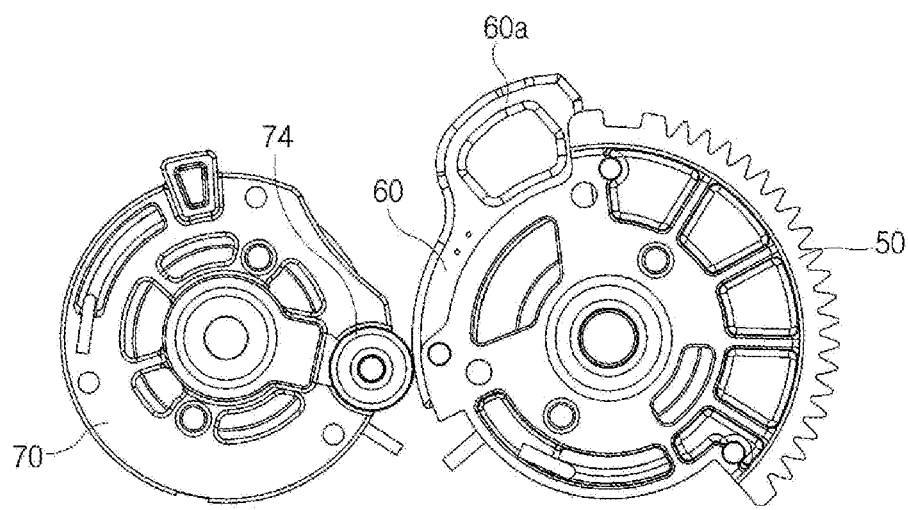
FIG. 2 is a view illustrating gear parts of an EGR valve unit when the EGR valve and an air intake valve are in their default positions respectively according to exemplary embodiments of the present disclosure.
Figure 3:
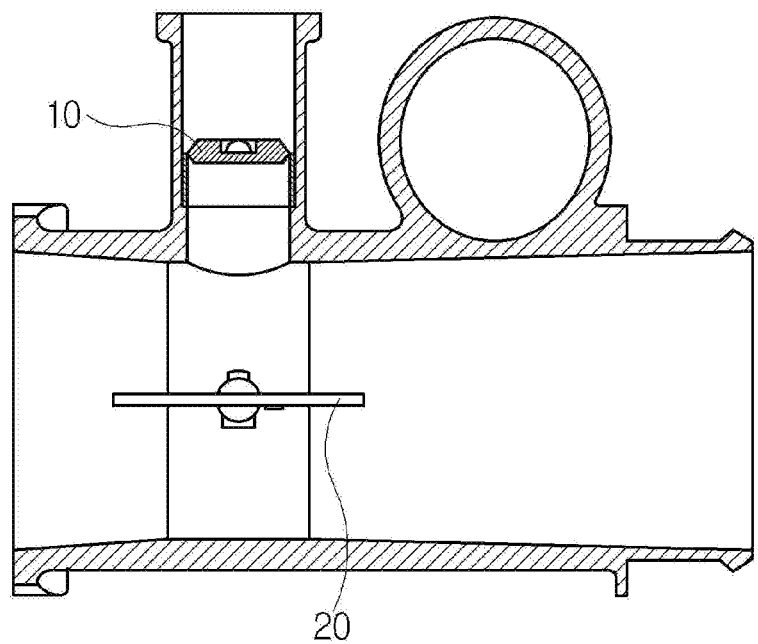
FIG. 3 is a view illustrating a state in which valves in a flow path are opened or closed when the EGR valve and the air intake valve of FIG. 2 are in their default positions respectively according to exemplary embodiments of the present disclosure.

Hereinafter, exemplary embodiments of the present disclosure will be described in detail with reference to the accompanying drawings. As shown in FIGS. 1 to 3, a housing of an EGR valve unit according to a first exemplary embodiment of the present disclosure may include a three-way structure in which an EGR gas passage is formed on one side of an air intake passage, wherein the housing includes an EGR valve 10 for controlling the amount of EGR gas and an air intake valve 20 for generating negative pressure for suction of EGR gas and regulating intake amount of air. Both the EGR valve 10 and the air intake valve 20 may be butterfly valves, and a state that the EGR valve 10 is fully closed and the air intake valve 20 is fully open may be set as a default state (i.e., initial state). The EGR valve 10 may be operated by a motor 30. Output of the motor 30 (output from an output gear 31) may be transmitted to a segment gear 50 via an intermediate gear 40, wherein the segment gear 50 may be mounted on an end of a shaft of the EGR valve 10.

A cam member 60 may be insert molded in a part of the outer periphery of the segment gear 50 to be rotated integrally with the segment gear 50. A rotation arm 70 may be mounted on an end of a shaft of the air intake valve 20, and a pin 72 may be mounted on one side of the top surface of the rotation arm 70. Further, a bearing 74 may be mounted to the pin 72, and the bearing 74 may abut the outer peripheral surface of the cam member 60.

A push part 60a may be formed at one side of the cam member 60 and configured to push the bearing 74 and thus rotate the rotation arm 70 to operate the air intake valve 10 from an open state to a closed state. In particular, the push part 60a may be connected to the cam member 60 and extend radially outward from the cam member 60. Therefore, the outer peripheral surface of the cam member 60 and the outer peripheral surface of the push part 60a may be connected to each other to form a curved surface such that the bearing 74 may roll while abutting them. Further, the segment gear 50 and the rotation arm 70 may include return springs 80 and 82 respectively to cause the EGR valve 10 and the air intake valve 20 to be forced to return back to their default positions (initial positions before operation) by the return springs respectively.

FIGS. 2 and 3 show positions of the segment gear 50, the cam member 60, the rotation arm 70, and the bearing 74 when the EGR valve 10 and the air intake valve 20 are in their default positions. The bearing 74 may be always in contact with the cam member 60. In the state where the EGR valve and the air intake valve are in their default positions, the bearing 74 may be in contact with the other end of the cam member 60 (i.e., opposite side of the portion where the push part 60a is formed). The bearing 74 and the push part 60a of the cam member 60 may be spaced apart from each other. In addition, the EGR valve 10 may be in the fully closed state while the air intake valve 20 may be in the fully open state.

Figure 4:
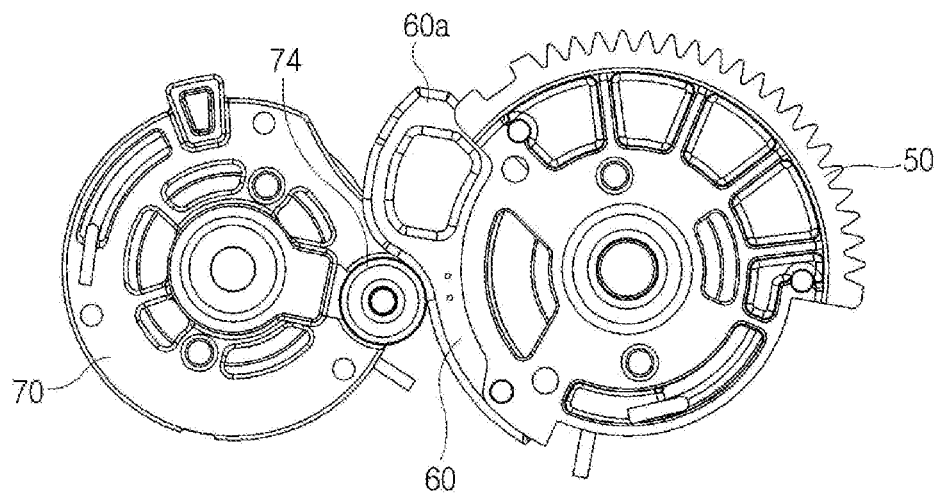
FIG. 4 is a view illustrating a state in which the EGR valve and the air intake valve are operated in the state of FIG. 2 according to exemplary embodiments of the present disclosure.
Figure 5:
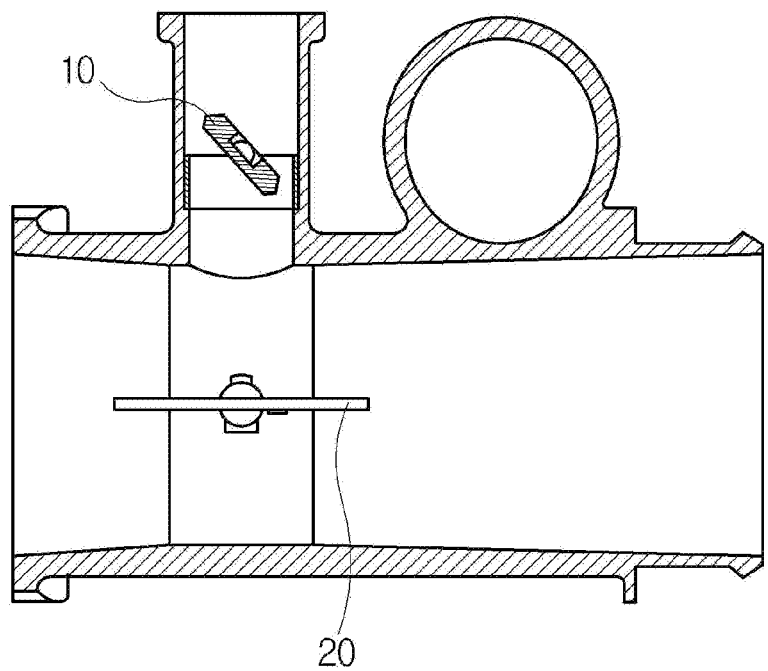
FIG. 5 is a view illustrating a state in which valves in a flow path are opened or closed in the state of FIG. 4 according to exemplary embodiments of the present disclosure.

As shown in FIGS. 4 and 5, when the motor 30 is operated, a rotational force of the motor may be transmitted through the output gear 31, the intermediate gear 40, and the segment gear 50 to cause the EGR valve 10 to adjust from a closed state (i.e., default position) to a state where the valve opening amount is increased. In other words, after a position where the segment gear 50 is rotated counterclockwise and thus the EGR valve 10 is open and the cam member 60 is rotated together with the segment gear 50 to allow the opening amount of the EGR valve 10 to be equal to or greater than a predetermined amount, the push part 60a of the cam member 60 may begin to push the bearing 74 and thus the rotation arm 70 may be rotated clockwise to cause the air intake valve 20 to be adjusted from an open state to a closed state.

In other words, the bearing 74 that is brought to contact with the outer peripheral surface of the cam member 60 may rotate while contacting the outer peripheral surface of the cam member 60 when the cam member 60 rotates, and may contact the outer peripheral surface of the push part 60a connected to the outer peripheral surface of the cam member 60 as the cam member 60 rotates by a predetermined angle or more. Accordingly, the bearing arm 70 may rotate while the bearing 74 moves along the outer peripheral surface of the push part 60a due to the difference in outer diameters between the push part 60a and the cam member 60.

Meanwhile, in this exemplary embodiment, the air intake valve 20 may be designed not to cooperate (e.g., rotate simultaneously) with the EGR valve 10 when the EGR valve rotates at an angle of 0 to 38 degrees. However, the present disclosure is not limited thereto and may be varied to optimize flow rate of EGR gas and intake air.

Figure 6:
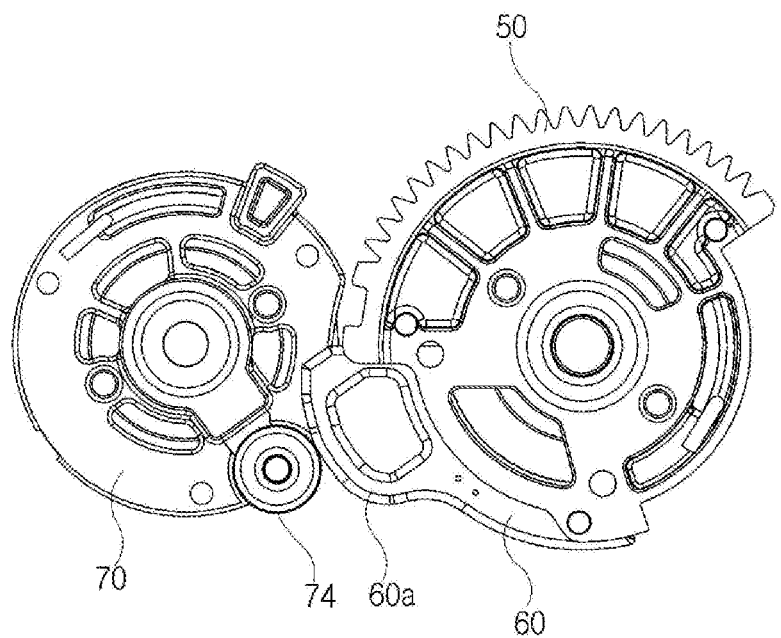
FIG. 6 is a view illustrating a state in which the EGR valve and the air intake valve are operated to the maximum according to exemplary embodiments of the present disclosure.
Figure 7:
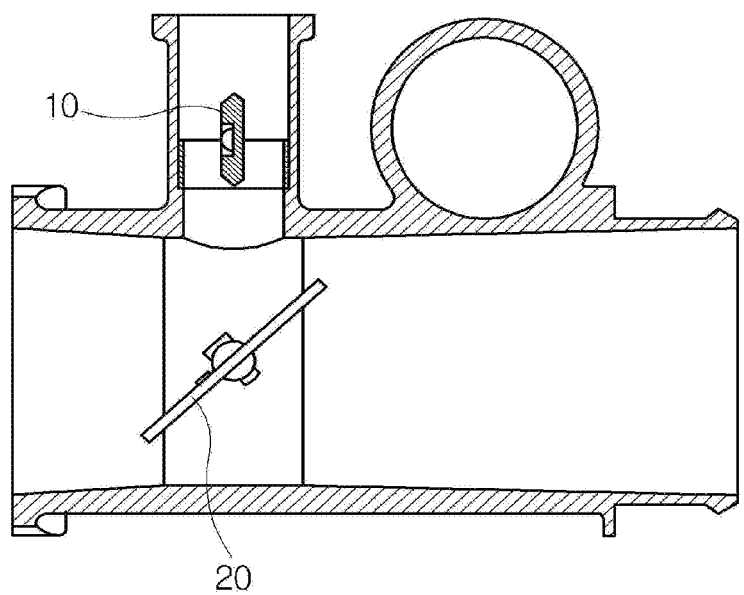
FIG. 7 is a view illustrating a state in which valves in a flow path are opened or closed in the state of FIG. 6 according to exemplary embodiments of the present disclosure.

FIGS. 6 and 7 show the state in which the EGR valve 10 is open to the maximum. When the EGR valve 10 is fully open, the air intake valve 20 may be changed to a fully closed state. The fully closed state of the air intake valve 20 may refer to a state in which the air intake valve is inclined by about 60 degrees with respect to the direction of the air intake passage and in which the air intake passage is blocked and the EGR gas passage is open such that the amount of EGR gas can be increased to the maximum.

Furthermore, in the state of FIG. 6, when operation of the motor 30 is stopped, the segment gear 50 and the rotation arm 70 may be rotated in reverse directions respectively by the respective return springs 80 and 82 to allow the EGR valve 10 and the air intake valve 20 to return back to their respective default positions.

Figure 9:
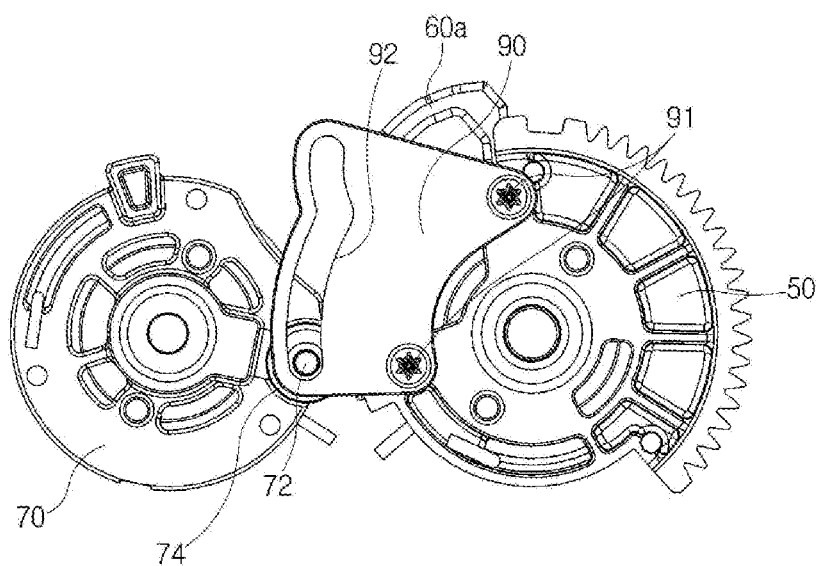
FIG. 9 is a view illustrating a gear part of an EGR valve unit provided with a return guide when the EGR valve and the air intake valve are in their default positions respectively according to exemplary embodiments of the present disclosure.

FIG. 9 illustrates a second exemplary embodiment in which a return guide 90 is added to the EGR valve unit according to the present disclosure.

In the second exemplary embodiment, similar to the first exemplary embodiment shown in FIGS. 1 to 7, a segment gear 50 and a rotation arm 70 may be mounted on shafts of an EGR valve 10 and an air intake valve 20 respectively, the segment gear 50 may be connected to a motor 30 via an intermediate gear 40 and an output gear 31, a cam member 60 including a push part 60a formed to protrude may be insert molded to the segment gear 50, and a bearing 74 may be mounted on the rotation arm 70 via a pin 72. Further, the bearing 74 may include a structure in which the bearing maintains a contact with the surface of the cam member 60.

Further, the EGR valve 10 and the air intake valve 20 may include respective return springs 80 and 82 for returning them back to their default positions after operation respectively. Therefore, when the motor 30 is operated, the EGR valve 10 may be operated through the output gear 31, the intermediate gear 40, and the segment gear 50, and when the EGR valve 10 is operated by a predetermined angle or more, the push part 60a of the cam member 60 may push the bearing 74 and force the rotation arm 70 to rotate to cause the air intake valve 20 to operate in cooperation with the EGR valve 10. In addition, after the EGR valve 10 and the air intake valve 20 are operated, they may return back to their original positions before operation by a restoring force of the return springs 80 and 82 provided therein respectively.

The EGR valve unit according to the second exemplary embodiment configured as described above may further comprise a return guide 90 mounted to the segment gear 50 to allow the rotation arm 70 to rotate with a guidance by the return guide to allow the air intake valve 20 to return back to its default position when the EGR valve 10 is returned back to its default position after operation, as shown in FIG. 9. The return guide 90 may be mounted on the outer surface of the segment gear 50 by a coupling means such as bolts 91. The return guide 90 may be installed in such a manner that it covers the installation area for the cam member 60 in the segment gear 50. In other words, the return guide 90 and the cam member 60 may be installed to overlap with each other.

A cam profile aperture 92 may be formed at an outer end of the return guide 90 (i.e., a portion that corresponds to a radially outer side of the segment gear 50, which may partially overlap with the top portion of the rotation arm 70), and a free end of the pin 72 of the rotation arm 70 may be inserted into the cam profile aperture 92. To make a coupling, the pin 72 may be formed to include a free end to extend axially along a rotation axis of the bearing 74 unlike the first exemplary embodiment. The extended end thereof may be inserted into the cam profile aperture 92.

The cam profile aperture 92 may be formed in the same curved shape as a profile surface (including a bearing contact surface of the push part 60a) on which the bearing 74 moves in rolling contact with the cam member 60. In addition, the cam profile aperture may be formed in a shape and a range which are defined to avoid causing interference with movement of the pin 72 when the bearing 74 moves along the profile surface of the cam member 60 upon cooperative operation of the EGR valve 10 and the air intake valve 20.

Figure 10:
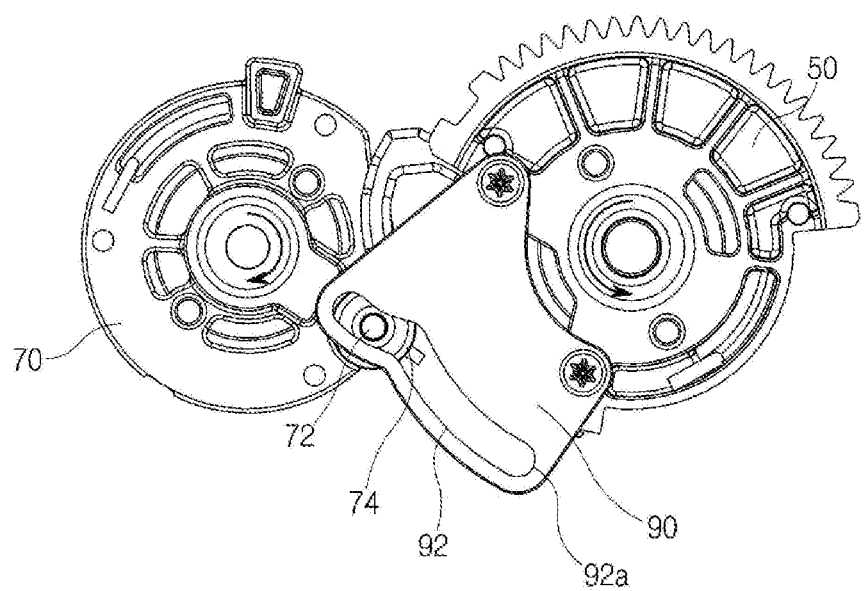
FIG. 10 is a view illustrating a state in which the EGR valve and the air intake valve are operated in the state of FIG. 9 according to exemplary embodiments of the present disclosure.

Therefore, as shown in FIG. 10, when a rotational force of the motor 30 is transmitted and thus the segment gear 50 is rotated so that the push part 60a of the cam member 60 pushes the bearing 74 and forces the rotation arm 70 to rotate, no contact may be made between the pin 72 and the inner surface of the cam profile hole 92. In other words, the cam profile aperture 92 may be prevented from exerting a force along a direction of the cam profile aperture 92 or in a transverse direction thereof.

Further, even when the rotational force for the EGR valve 10 generated by the motor 30 is discontinued and the segment gear 50 and the rotation arm 70 return back to their default positions by action of the return springs 80 and 82, the pin 72 and the cam profile aperture 92 may maintain a contact with each other due to the two return springs, and the returning operation of the segment gear 50 and the rotation arm 70 may be unaffected. In other words, a structure of connection between the pin 72 and the cam profile aperture 92 may not affect a cooperative structure between the EGR valve 10 and the air intake valve 20, more specifically a cooperative structure between the segment gear 50 and the rotation arm 70 through the cam member 60. Accordingly, when the EGR valve 10 and the air intake valve 20 operate normally and their respective return springs 80 and 82 operate normally, no action of the return guide 90 may be made.

Figure 8:
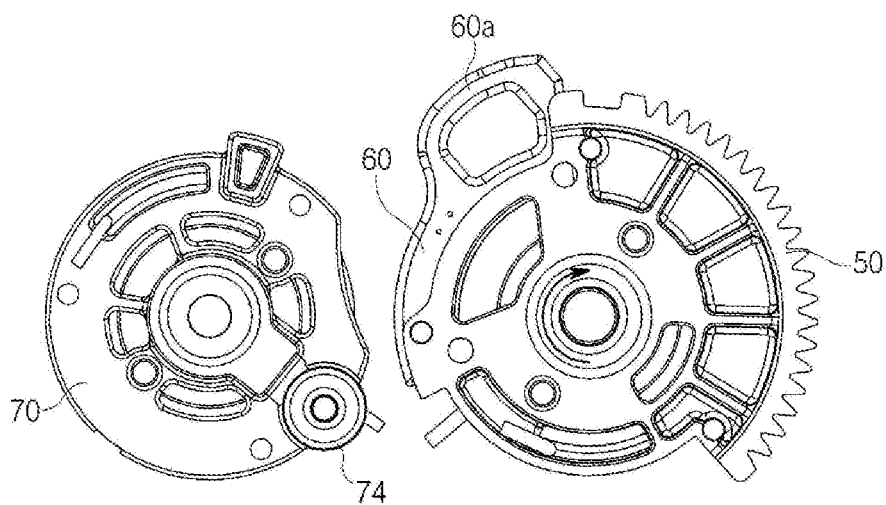
FIG. 8 is a view illustrating a failure state of a return spring of the air intake valve, in which only the EGR valve is returned back but the air intake valve is not returned back in the state of FIG. 6 according to exemplary embodiments of the present disclosure.

For the first exemplary embodiment in which no return guide 90 is provided as shown in FIG. 8, when the return spring 82 of the air intake valve 20 fails, only the segment gear 50 and the cam member 60 of the EGR valve 10 side may return back to the default position, but the rotation arm 70 and the bearing 74 of the air intake valve 20 side may fail to be returned back to the default position after the EGR valve 10 and the air intake valve 20 are operated. Therefore, when the EGR valve 10 is operated again thereafter, normal operation of the air intake valve 20 in cooperation with the EGR valve may be impossible, and the air intake valve 20 may be maintained in the closed state. The failure of the cooperation may cause an unstable output of the engine, and in severe cases, the engine may stall due to lack of normal control of the intake amount of air in consideration of the amount of EGR gas.

Conversely, for the second exemplary embodiment, when the segment gear 50 rotates in the reverse direction (clockwise) and returns back to its default position, a wall surface 92a of one side of the cam profile aperture 92 may push the pin 72 and force the rotation arm 70 to rotate toward the original position to allow the air intake valve 20 to be returned back to its default position. Therefore, even when the return spring 82 of the air intake valve 20 fails while the vehicle is being operated, the return guide 90 mounted to the segment gear 50 may guide the pin 72 and force the rotation arm 70 to rotate to return back to its default position to allow the air intake valve 20 to be forcibly returned back to the default position without being maintained in the closed state, and thus, the air intake passage may be open.

The operation of the EGR valve unit may be repeated in the same manner when the EGR valve 10 is operated again, and the air intake valve 20 may be operated in cooperation with the EGR valve. Therefore, since the cooperative operation of the EGR valve 10 and the air intake valve 20 may be performed similarly as the normal state in which the return spring 82 is functional, control of the air intake valve may be performed similarly as the normal state to prevent fluctuation of the engine output (e.g., jerking may be prevented), and in particular, engine stalling due to insufficient amount of intake air may be prevented.

Figure 11:
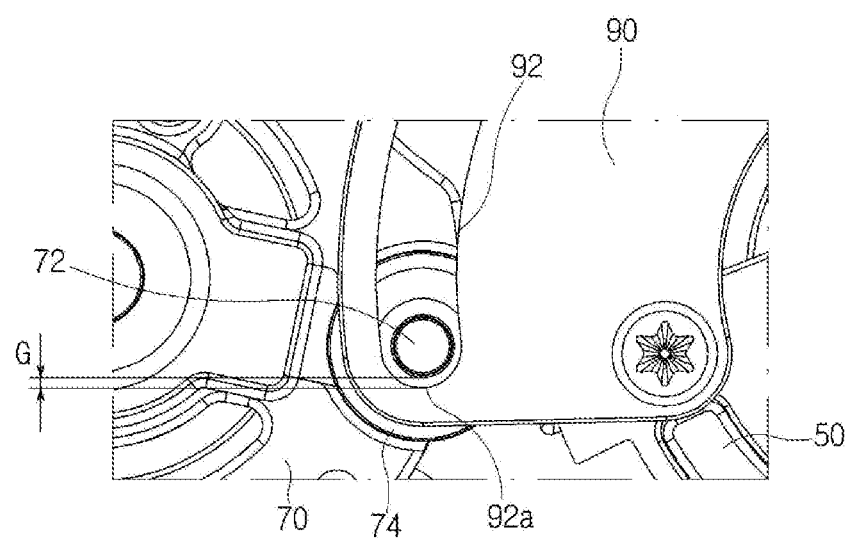
FIG. 11 is a view illustrating a structure in which a gap is formed between an inner wall of the return guide and a pin for mounting a bearing to detect failure of the return spring according to exemplary embodiments of the present disclosure.

Moreover, when the EGR valve 10 and the air intake valve 20 are not operated and are in their default positions (i.e., the state shown in FIG. 9), a gap G having a predetermined interval may be formed between the pin 72 and the wall surface 92a of one side of the cam profile aperture 92 of the return guide 90 (see FIG. 11). The gap G may have a value set properly and may be set to about 1.0 mm to 2.0 mm. Due to the gap G, when the return spring 82 of the air intake valve 20 malfunctions and thus the air intake valve 20 is operated in a state forcibly returned back to the default position by the return guide 90, the pin 72 may return to an extent that is less than the normal default position by an interval of the gap G.

In other words, even when the return guide 90 of the EGR valve 10 side is returned back to the default position, the pin 72 may maintain a contact with the wall surface 92a of one side of the cam profile aperture 92 since the pin 72 is returned while being in contact with the wall surface 92a of one side of the cam profile aperture 92, and therefore, the pin 72 may not completely return back to the normal default position but return back up to an extent that is less than the normal default position by the interval of the gap G (e.g., a failure default position). Therefore, the air intake valve 20 linked with the pin 72 and the rotation arm 70 may not return back to the normal default position, either, but return back up to an extent that is less than the normal default position by an angle that corresponds to the gap G.

An air intake valve return sensor for detecting whether or not the air intake valve 20 is returned back to its default position by using the above-described action may transmit a signal indicating that the air intake valve 20 is not returned completely back to the normal default position from the air intake valve return sensor to the engine control unit (the sensor may be installed inside the air intake passage of the housing to directly detect a valve plate of the air intake valve, or otherwise installed in a casing enclosing the gear parts (i.e., portions for installing the segment gear and the rotation arm) to detect a specific position of a shaft of the air intake valve or the rotation arm).

When the engine control unit recognizes by the signal transmitted from the air intake valve return sensor that the air intake valve 20 has not returned back to the normal default position, it may be determined that an abnormality has occurred in the return spring 82 for the air intake valve 20 and a warning sign (e.g., a check engine light, a warning lamp, an audible warning, or the like) provided on an instrument panel may be activated to notify the driver of the abnormality of the return spring 82. Accordingly, the driver may recognize the abnormality of the return spring 82 by the warning sign and then proceed to replace or repair the return spring 82.

On the other hand, even when the warning sign is turned on due to occurrence of the abnormality in the return spring 82 as described above, the rotation arm 70 may be linked with the return guide 90 as described above to allow the air intake valve 20 to return back to the failure default position (offset by a difference that corresponds to the gap G). As a result, since control of the air intake valve like the normal state may be possible to prevent fluctuation of engine output or stoppage of the engine, the vehicle may be driven to a repair shop.

Although the present disclosure has been described with reference to exemplary embodiments shown in the accompanying drawings, it is to be understood that the description is provided by way of example. It will be appreciated by those skilled in the art that various changes and equivalent alternative embodiments may be made without departing from the scope of the present disclosure. Therefore, the true scope of the present disclosure should be determined by the following claims.

What is claimed is:

1. An EGR valve unit comprising:
a segment gear disposed on a shaft of an EGR valve;
a rotation arm disposed on a shaft of an air intake valve;
a bearing disposed on the rotation arm via a pin;
a cam member disposed on the segment gear and formed with a push part configured to push the bearing to rotate the rotation arm when the EGR valve is operated;
a return guide disposed on the segment gear, a cam profile aperture into which a free end of the pin is inserted is formed, and a gap is formed between the free end of the pin and a wall surface of the one side end of the cam profile aperture;
an air intake valve return sensor for detecting a non-return status of the air intake valve to the default position;
wherein each of the EGR valve and the air intake valve includes a return spring for allowing the EGR valve and the air intake valve to return to the default positions by an elastic force of the return spring,
wherein when the air intake valve does not return to the default position due to a malfunction of the return spring, the return guide causes the wall surface of one side of the cam profile aperture to push the free end of the pin inserted into the cam profile aperture to rotate the rotation arm to rotate the air intake valve to the default position.
wherein the gap is formed between the free end of the pin and the wall surface of the one side end of the cam profile aperture when the segment gear and the rotation arm are in the default positions,
wherein the air intake valve return sensor detects the gap and recognizes the non-return status of the air intake valve to the default position, when the air intake valve returns to the default position by the return guide, the air intake valve backs up to an extent that is less than the default position by the interval of the gap due to the pin maintaining a contact with the wall surface of the one side of the cam profile aperture.

2. The EGR valve unit according to claim 1, wherein the bearing is configured to abut an outer peripheral surface of the cam member and move along the outer peripheral surface of the cam member when the cam member rotates.

3. The EGR valve unit according to claim 1, wherein the return guide includes a first end thereof fixed to one side of the segment gear by means of bolts and a second end thereof overlapping with the rotation arm, and a cam profile aperture is formed in the overlapping portion.

4. The EGR valve unit according to claim 3, wherein the cam profile aperture corresponds to a shape of a cam profile face of the cam member to prevent the pin from interfering with an inner surface of the cam profile aperture when the segment gear and the rotation arm operate.

5. The EGR valve unit according to claim 1
wherein an engine control unit receives a signal from the air intake valve return sensor and recognizes the non-return status of the air intake valve and activates a warning sign.

6. The EGR valve unit according to claim 1, wherein an intermediate gear is meshed with the segment gear, and an output gear of a motor is meshed with the intermediate gear.

* * * * *